No. 752,048. PATENTED FEB. 16, 1904.
T. DUNCAN.
ELECTRIC METER.
APPLICATION FILED OCT. 23, 1903.
NO MODEL.

Witnesses:
Carl M. Crawford
Leon Stroh

Inventor:
Thomas Duncan
by G. L. Cragg
his Attorney

No. 752,048.

Patented February 16, 1904.

UNITED STATES PATENT OFFICE.

THOMAS DUNCAN, OF LAFAYETTE, INDIANA.

ELECTRIC METER.

SPECIFICATION forming part of Letters Patent No. 752,048, dated February 16, 1904.

Application filed October 23, 1903. Serial No. 178,249. (No model.)

*To all whom it may concern:*

Be it known that I, THOMAS DUNCAN, a citizen of the United States, residing at Lafayette, in the county of Tippecanoe and State of Indiana, have invented a certain new and useful Improvement in Electric Meters, of which the following is a full, clear, concise, and exact description, reference being had to the accompanying drawings, forming a part of this specification.

My invention relates to electric meters employing motors and counting-trains operated thereby, and has for its object the provision of improved means for compensating for the friction and inertia of the moving parts of the meter.

The invention relates particularly to meters wherein compensating coils are employed that serve as initial or supplemental field-producers that coöperate with the armature to furnish a torque that should balance or nearly balance the friction. These compensating or torque coils are arranged to be constantly in circuit, whether any translating means upon the circuit containing the meter are in service or not. In this way a torque may be exerted upon the shaft of the meter that about balances the braking effect due to the friction at the lower bearing of the shaft, inertia of the moving parts, and friction elsewhere encountered, as in the bearings of the counting-train, the torque enabling the meter to start upon very light loads. In process of time, however, the friction of the moving parts increases or varies, and the compensation initially provided for by the compensating coils may not be that which is later required, or the torque initially secured and found sufficient in the factory may be too great where the meter is likely to "creep." In the latter case the reaction of the field produced by the torque upon the armature should be reduced, in the former it should be increased. I have provided an improved means for securing the degree of starting torque that may at any time be required. To this end I employ one or more compensating coils in each meter structure, which coils are most desirably held within the field-coils of the meter. These compensating coils are each provided with a regulating-switch that serves to determine the amount of its winding that is included in circuit, a variation of the amount consequently effecting a variation in the resulting field and torque.

I will explain my invention more fully by reference to the accompanying drawings, in which—

Figure 1:
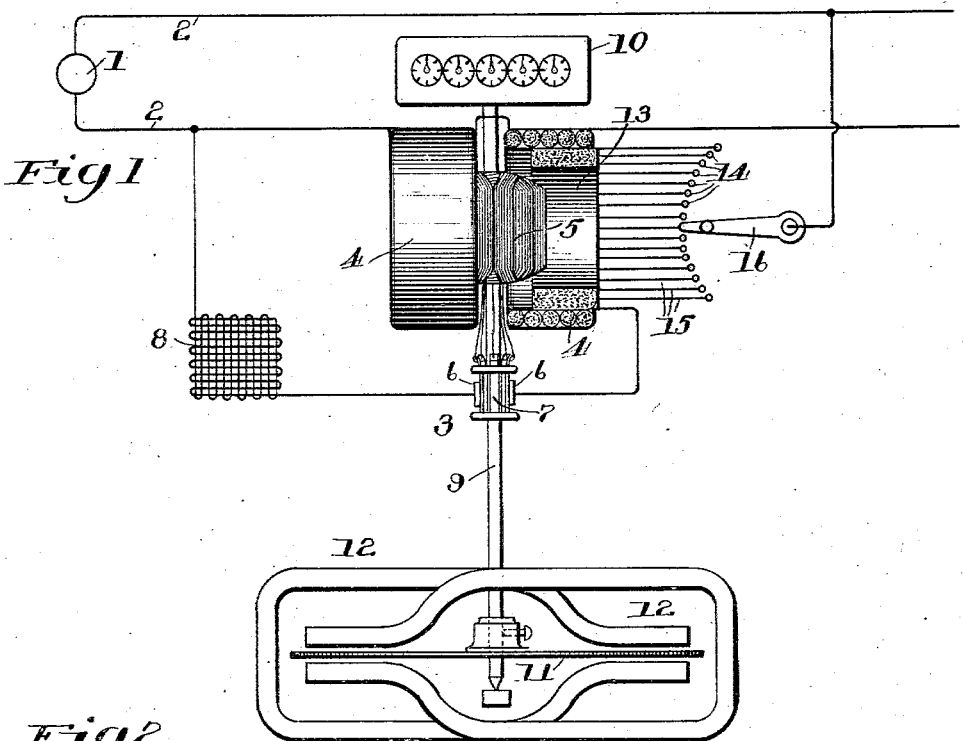
Figure 2:
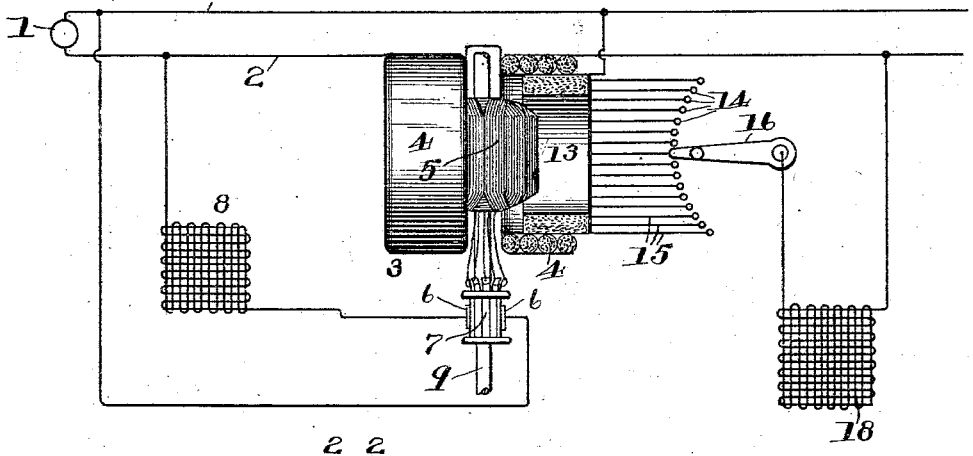
Figure 3:
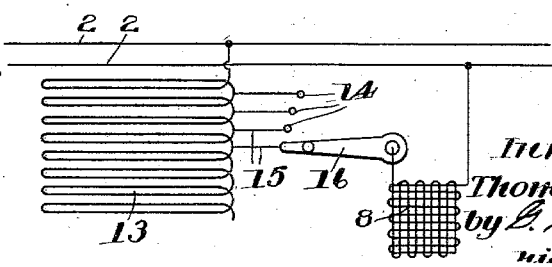

Figure 1 is a view in elevation, partially in section, of structural parts of my improved meter, circuit connections being diagrammatically indicated. Fig. 2 is a view generally similar to Fig. 1 with a modification of circuit connections and arrangement of resistance. Fig. 3 is a view diagrammatically indicating certain of the torque or compensating coil connections.

Like parts are indicated by similar characters of reference throughout the different figures.

I have indicated a source of current 1 supplying current to the mains 2 2, that extend to the translating means at the district of consumption. A commutated meter 3 is illustrated in circuit, the current or field coils being in series with a main and subdivided into two stationary coils 4 4 and a pressure-winding in the form of an armature 5, whose coils are included in bridge of the mains to be subject to the impressed pressure, the circuit being completed through the agency of commutator-brushes 6, bearing upon a commutator 7. A resistance 8 is included in the same bridge with the armature. Any suitable braking arrangement may be employed for reducing the speed of the armature-shaft 9, and thereby the rate of operation of the measuring element 10. I have indicated a damping-disk 11, arranged within the fields of damping permanent magnets 12. Each meter is provided with one or more torque or compensating coils 13, one only being indicated in each of the figures. At intervals along the length of the wire of this coil are connected buttons 14, such connections being desirably effected by means of branches 15. These buttons are arranged in a row, preferably of arc form, to be engaged by a switch-arm 16, by a rotation of which more or less of the compensating winding may be included in circuit. The compensating coil is so secured upon the field and with respect to the armature that all of the turns thereof are not initially included in circuit, the switch-arm engaging an intermediate button 14, so that when the meter is put out to service a portion of the compensating winding may be excluded from circuit to avoid creeping, or additional winding may be included in circuit to compensate for any increase in friction that arises. The switching device and the connections thereof with the compensating coil thus form a very effective means for varying the field, due to the compensating or torque coil. The switch-arm 16 is connected with one main, a terminal of the torque-coil with the other main, and more or less of the torque-coil between the mains, according to the position of the switch-arm. The torque-coil is desirably wound in such a manner that a tap or branch 15 may be brought out every fifty or one hundred turns or any other number preferable. For example, when the switch-arm 16 is on the uppermost contact-button there may only be a few hundred turns of the coil in bridge of the mains, the number of turns included in bridge being increased as the switch-arm is moved downwardly. As indicated, each compensating or torque coil is included in bridge of the mains, so as to be subject to the impressed pressure and so as to create a field that is constant in strength for a given position of the switch-arm and always present irrespective of the presence or absence of translating devices in the consumption-circuit. The torque or compensating coil is suitably included in circuit in accordance with either arrangement shown. In Fig. 1 it is shown partially included and adapted for complete inclusion in series with the armature and commutator. In Fig. 2 the armature and commutator are in one bridge, while the torque-coil is shown partially included and adapted for complete inclusion in a bridge between the means that is distinct from the armature-bridge. In the arrangement shown in Fig. 1 obviously a single extraneous resistance 8 will be sufficient for both the armature and compensating coil. In the arrangement shown in Fig. 2 additional resistance 18 is desirable for the compensating coil.

There is a particularly advantageous result gained by means of my invention that is not readily apparent without explanation. To those familiar with the art it is known that when a meter has been in service some time it not only usually runs too slow on light loads, but runs a little fast on high loads by reason of the magnets becoming weakened. I have found that by cutting more turns of the compensating coil into circuit increased friction is not only compensated for to correct speed on small loads, but at the same time it also may correct the increased speed on full load by virtue of the increase effected in the resistance in the armature-circuit. I prefer, however, to make the coil of as low resistance as possible in comparison with the resistance of the armature and resistance 8, though it would be possible to make said coil of high resistance-wire and connect it directly across the mains. The arrangement shown in Fig. 2 has the advantage of permitting the turns comprising it to be changed without in any way interfering with the resistance of the armature, which is in a bridge of its own.

By means of my invention I am enabled to secure the proper compensation by a coil which is immovably mounted in a fixed support and which may be rigidly secured within the series field-coil in a manner to prevent its being tampered with. If desired, the compensating winding may be taped to the series coil and may be disposed upon the exterior or interior thereof and distributed to both series field-coils, if desired.

Having thus described my invention, I claim as new, and desire to secure by Letters Patent, the following:

1. The combination with a source of current, of mains leading therefrom to supply translating devices, a motor-meter having an armature and a current field-winding, a friction compensating coil subject to the pressure of the circuit and provided to furnish a field for the armature and a switching device having a number of contact-buttons connected with different portions of said coil and a switch-arm adapted to engage said buttons and thereby render more or less of said coil subject to the pressure of the circuit, substantially as described.

2. The combination with a source of current, of mains leading therefrom to supply translating devices, a motor-meter having a current field-winding and a wound armature with its commutator and brushes, said armature being subject to the pressure of the circuit, a friction compensating coil subject to the pressure of the circuit and provided to furnish a field for the armature and a switching device having a number of contact-buttons connected with different portions of said coil and a switch-arm adapted to engage said buttons and thereby render more or less of said coil subject to the pressure of the circuit, substantially as described.

3. The combination with a source of current, of mains leading therefrom to supply translating devices, a motor-meter having an armature and a current field-winding, a friction compensating coil subject to the pressure of the circuit and provided to furnish a field for the armature and switching mechanism for rendering more or less of said coil subject to the pressure of the circuit, substantially as described.

4. The combination with a source of current, of mains leading therefrom to supply translating devices, a motor-meter having a current field-winding and a wound armature with its commutator and brushes, said armature being subject to the pressure of the circuit, a friction compensating coil subject to the pressure of the circuit and provided to furnish a field for the armature and switching mechanism for rendering more or less of said coil subject to the pressure of the circuit, substantially as described.

5. In a meter, the combination with the motor element thereof, including armature and field portions, of a friction compensating coil for producing a field for the armature and a switching device having a number of contact-buttons connected with different portions of said coil and a switch-arm adapted to engage said buttons and thereby include more or less of said coil in circuit, substantially as described.

6. In a meter, the combination with the motor element thereof, including field portions and a wound armature with its commutator and brushes, of a friction compensating coil for producing a field for the armature and a switching device having a number of contact-buttons connected with different portions of said coil and a switch-arm adapted to engage said buttons and thereby include more or less of said coil in circuit, substantially as described.

7. In a meter, the combination with the motor element thereof, including armature and field portions, of a friction compensating coil for producing a field for the armature, and switching mechanism for including more or less of said coil in circuit, substantially as described.

8. In a meter, the combination with the motor element thereof, including field portions and a wound armature with its commutator and brushes, of a friction compensating coil for producing a field for the armature and switching mechanism for including more or less of said coil in circuit, substantially as described.

9. In a meter, the combination with the motor element thereof, including armature and field portions, of a friction compensating coil adapted to be located between the mains of the system containing the meter for producing a field for the armature and a switching device having a number of contact-buttons connected with different portions of said coil, and a switch-arm adapted to engage said buttons and thereby include more or less of said coil in circuit, substantially as described.

10. In a meter, the combination with the motor element thereof, including field portions and a wound armature with its commutator and brushes, of a friction compensating coil adapted to be located between the mains of the system containing the meter for producing a field for the armature and a switching device having a number of contact-buttons connected with different portions of said coil, and a switch-arm adapted to engage said buttons and thereby include more or less of said coil in circuit, substantially as described.

11. In a meter, the combination with the motor element thereof, including armature and field portions, of a friction compensating coil adapted to be located between the mains of the system containing the meter for producing a field for the armature, and switching mechanism for including more or less of said coil in circuit, substantially as described.

12. In a meter, the combination with the motor element thereof, including field portions and a wound armature with its commutator and brushes, of a friction compensating coil adapted to be located between the mains of the system containing the meter for producing a field for the armature, and switching mechanism for including more or less of said coil in circuit, substantially as described.

In witness whereof I hereunto subscribe my name this 23d day of September, A. D. 1903.

THOMAS DUNCAN.

Witnesses:
CHARLES JONES,
BLANCHE A. MILLER.